United States Patent [19]

Lowery et al.

[11] Patent Number: 4,666,718

[45] Date of Patent: May 19, 1987

[54] PREPARATION OF LOW CALORIE BEER

[75] Inventors: Charles E. Lowery, Milwaukee; George R. Duncombe, Grafton; William F. Line, Glendale; Etzer Chicoye, Wauwatosa, all of Wis.

[73] Assignee: Miller Brewing Company, Milwaukee, Wis.

[21] Appl. No.: 640,930

[22] Filed: Aug. 15, 1984

[51] Int. Cl.$^4$ .................. C12C 11/04; C12N 9/44
[52] U.S. Cl. ............................ 426/13; 436/16; 435/98; 435/210
[58] Field of Search ................ 426/13, 16; 435/98, 435/210

[56] References Cited

U.S. PATENT DOCUMENTS 3,379,534   4/1968   Gablinger ........................ 426/13

FOREIGN PATENT DOCUMENTS 0125615   11/1984   European Pat. Off. .

OTHER PUBLICATIONS

Sills, A. M., Sauder, M. E. and Stewart G. C., Amylase Activity in Certain Yeasts and a Fungal Species, Dev. in Ind. Microbiology 24 (1982). This article discloses that *Schwanniomyces castellii* produces an alpha amylase and a glucoamylase.

Sills, A. M., Russell, I. & Stewart, G. G., The Production & Use of Yeast Amylases in the Brewing of Low Carbohydrate Beer, presented at 19th Internat'l Congress European Brewery Convention (London Jun. 5-10, 1983). This reference discloses the use of Yeast Amylases from *Schwanniomyces castellii* to prepare a low calorie beer from a wort prepared with solid cereal adjuncts.

Dhawale, M. R. & Ingledew, W. M., Starch Hydrolysis by Derepressed Mutants of *Schwanniomyces castellii*, Biotechnology Letters vol. 5, No. 3 pp. 185–190 (1983). This article discloses the preparation of *S. castellii* which produces elevated levels of glucoamylase.

Sills, A. M. & Stewart, G. G., Production of Amylolytic Enzymes by Several Yeast Species, J. Inst. Brew. Sep.-Oct., vol. 88, pp. 313–316 (1982). This article discloses the production of a glucoamylase having debranching properties by *Schwanniomyces castellii* strain 1402.

Clementi, F., Rossi, J., Costamagna, L. & Rosi, J., Production of Amylase(s) by *Schwanniomyces castellii* & *Endomycopsis fibuligera*, Antonie van Leeuwenhoek 46 pp. 399–405 (1980). This article discloses that *S. castellii* is able to produce both an α-amylase & a glucoamylase.

Oteng-Gyang, K., Moulin, G. & Galzy, P., Effect of Medium Composition on Excretion and Biosynthesis of the Amylases of *Schwanniomyces castellii*, European J. Appl. Microbiol. Biotechnol. 9, pp. 129–132 (1980). The article discloses that the complete extraction of α-amylase and glucoamylase from *S. castellii* is necessary for complete utilization of starch.

Oteng-Gyang, K., Moulin, G. & Galzy, P. A Study of the Amylolytic System of *Schwanniomyces castellii*. Zeitschrift fur Allegemeine Mikrobiologie, 21, pp. 537–544 (1981). This article discloses that *S. castellii* growth produces both extra- and intracellular α-amylase and glucoamylase activities.

Sills, A. M., Russell, I. & Stewart, G. G., The Production and Use of Yeast Amylases in the Brewing of Low Carbohydrate Beer, Lecture No. 40 E.B.C. Congress 1983 pp. 377–384. This lecture described the use of amylolytic enzymes of a de-repressed strain of *Schwanniomyces castelli* to produce a low carbohydrate beer from a wort made from grain including corn adjunct.

Wilson, J. J., Khachatourians, and Ingledew, W. M. Schwanniomyces: SCP and Ethanol from Starch, Biotechnology Letters vol. 4, No. 5 pp. 333–338 (1982). This article discloses that *Schw. castelli* produces a glucoamylase.

*Primary Examiner*—Christine M. Nucker
*Attorney, Agent, or Firm*—Quarles & Brady

[57] ABSTRACT

A superattenuated low calorie beer is prepared from a wort containing as a liquid adjunct a starch-derived syrup which contains dextrins by adding to the wort during fermentation a glucoamylase type debranching enzyme obtained from *Schwanniomyces castellii*.

3 Claims, No Drawings

PREPARATION OF LOW CALORIE BEER

FIELD OF THE INVENTION

The present invention relates generally to a method of preparing a beer. More particularly, it relates to a method of preparing a reduced carbohydrate low calorie beer which is formulated with liquid adjuncts, such as starch derived syrups.

DESCRIPTION OF THE PRIOR ART OR BACKGROUND

A typical lager sweet wort consists of a complex mixture of starch derived carbohydrates, which are classified as fermentable or non-fermentable according to whether they can be converted into ethanol by brewer's yeast. The fermentable carbohydrates are formed by hydrolysis of grain starches by two enzymes, $\alpha$ and $\beta$-amylase, derived from malted barley. In most American lagers the malted barley also serves as the predominant starch source while a smaller proportion is derived from nondiastatic adjunct grains. In the U.S., corn grits, #4 brewer's rice and various corn syrups are the predominant adjuncts.

All grain starches are glucose homopolymers in which the glucose residues are linked by either $\alpha$-1,4 or $\alpha$-1,6 bonds. During the mashing cycle the starches are first solubilized and then a portion of the solubilized large starch molecules are hydrolyzed to non-fermentable dextrins and to three low molecular weight sugars which brewer's yeast can ferment to ethyl alcohol. The major fermentable sugars are glucose, maltose, and maltotriose while traces of sucrose and fructose are also present.

The non-fermentable or limit dextrin fraction consists of all sugars of a higher degree of polymerization (DP) than maltotriose. The bulk of the limit dextrins appear to be quite large since most are retained by diafiltration membranes which are able to pass molecules $\leq 10,000$ daltons.

As indicated above, the hydrolysis of the grain starches is catalyzed by two amylases endogenous to malted barley. One, $\alpha$-amylase, is an endoamylase which randomly cleaves $\alpha$-1,4 bonds in the interior of the raw, largely insoluble starch molecules, fragmenting them into large but soluble polysaccharides termed dextrins. The second, $\beta$-amylase, is an exo-amylase which sequentially cleaves $\alpha$-1,4 bonds from the non-reducing end of these dextrins producing the three fermentable sugars described above. Both enzymes are inactive towards the $\alpha$-1,6 linkages (branch points) of the starches (i.e. they are unable to debranch the starch molecule) and this results in the formation of the forementioned limit dextrins.

The composition of the wort can vary depending on starting materials, mash cycle and other variables. The carbohydrate composition of a typical wort consists of 65-80% fermentable sugars, and limit dextrins ranging from 20-35%. At the end of fermentation, the fermentable fraction is converted to ethanol at a final concentration ranging from about 3 to about 6% w/w. The limit dextrins are not converted during fermentation and form the majority of the dissolved solids (termed real extract) in the final beer.

Recently, reduced calorie beers have become popular in the U.S. beer market. These beers may be formulated by: (1) reducing both the alcohol and real extract concentrations in the beer to attain the desired calorie level, or (2) by hydrolyzing the limit dextrins to fermentable sugars with exogenous enzymes, one component of which is capable of debranching the limit dextrins. The latter method is advantageous since it allows one to attain the desired calorie level with minimum reduction of the alcohol content of the packaged product. The exogenous enzyme most commonly used to hydrolyze the limit dextrins is glucoamylase, a nonspecific exoamylase derived from a variety of fungal sources e.g. *Aspergillus niger, Rhizopus delemar*, etc. (Pazur, J. Methods of Enzymology, XVIII (ed. Ginsberg, V.), Academic Press (1975), p. 931).

Glucoamylase is active vs. both $\alpha$-1,4 and $\alpha$-1,6 linkages and therefore is capable of hydrolyzing starch to glucose. It attacks the starch molecule from the nonreducing end producing glucose as the sole end product. It is also active vs. starch derived oligosaccharides, e.g. maltose, maltotriose, isomaltose, etc.

In theory debranching enzymes, such as glucoamylase, may be added at any time during the brewing process. In practice brewers prefer to add them in fermentation because the fermentation process itself requires 6-15 days depending on pitching rate, fermentation, temperature, etc. In contrast, the brewhouse operations are of much shorter duration (2-4 hrs/brew) and it operates under tight scheduling constraints. Therefore, these enzymes are employed as fermentation adjuncts as taught by Gablinger in U.S. Pat. No. 3,379,534, and the limit dextrins are hydrolyzed to fermentable sugars, which the yeast convert to ethanol. Operationally these beers ferment to a lower specific gravity because of (1) increased alcohol, and (2) decreased real extract as compared to the same beer prepared without the use of exogenous enzymes. Such beers are referred to as superattenuated beers.

In contrast to European brewers, U.S. brewers have always derived substantial quantities of wort extract (fermentable and non-fermentable carbohydrates) from sources other than malted barley. These sources are termed adjuncts and consist for the most part of ungerminated cereal grains termed cereal adjuncts, and corn syrups supplied commercially by the corn wet milling industry, termed liquid adjuncts. The cereal adjuncts most commonly employed by U.S. brewers are corn grits and broken polished rice. U.S. brewers typically derive from 30-50% of the wort extract from these adjuncts.

Cereal adjuncts are processed simultaneously with malt using a double mash upward infusion system. Typically the cereal adjunct is added to a vessel called the cereal cooker which contains a charge of malt ranging from 10-20% w/w of that of the adjunct. The cooker mash is rested at temperatures ranging from 100°-120° F. for 20-40 minutes. The mash is then raised to a vigorous boil in about 50-60 minutes and held there for 20-45 minutes. During the rise the mash gels as the starch imbibes water and then liquifies as the malt enzymes, particularly $\alpha$-amylase, causes the swollen starch granules to rupture and disperse throughout the mash.

As the contents of the cooker mash are being boiled the majority of the malt is charged into a second larger vessel called the mash tun. The malt mash is rested at 100°-120° F. to extract the diastases for a period ranging from 15-30 minutes, the end of which coincides precisely with the end of boiling of the cereal cooker mash. The contents of the cereal cooker are then transferred to the mash tun so that the combined contents of the mash tun are elevated to the conversion temperature. The combined mash is held at the desired conversion temperature (150°–160° F.) for a fixed period of time (40–90 minutes). During the rise to and rest at conversion temperature the malt enzymes hydrolyze the liquified adjunct and malt starches to the three fermentable sugars described above. At the end of the conversion period, the contents are mashed off, i.e. heat is applied to raise the mash tun contents to temperatures ranging from 170°–185° F., which serves to inactivate the malt enzymes and to facilitate the subsequent filtration operation (lautering or mash filter) which yields the clarified sweet wort.

In contrast to cereal adjuncts, liquid adjuncts are commonly added to the clarified wort at the kettle. The most commonly used liquid adjuncts are starch-derived syrups, such as corn syrups, which have low to moderate dextrose equivalents (D.E.) of about 30 to about 65. The use of liquid adjuncts offers several advantages (Bradee, L., in "The Practical Brewer" H. Broderick (ed.) published by the Master Brew. Assoc. of Americas, 1978):

(1) All-malt mashes with liquid adjuncts run off faster than double infusion mashes with cereal adjuncts. This permits the production of more brews in the same period of time which in turn increases the capacity of a normal brewhouse with limited capital investment.

(2) Liquid adjuncts facilitate high gravity brewing. This increases the production capacity of the brewery with no capital investment.

(3) Quantitative extract yields are obtained from liquid adjuncts. In comparison substantial losses are incurred during the lautering operation of double infusion mashes.

(4) Liquid adjuncts are easier to sanitize, store and handle. Their use permits the elimination of cereal adjunct grain equipment (storage bins, conveyors, mills, scales) which are expensive and sources of infestation.

(5) A wide variety of liquid adjuncts are available from commercial corn wet millers. The brewer is thus able to use these products to vary the composition of the wort over a wide range.

(6) The compositions of liquid adjuncts can be controlled within very narrow specifications. This assures the brewer of uniformity of the adjunct ingredient.

Liquid adjuncts are produced by three basic processes:

(1) The acid process in which starch is liquified and saccharified with acid at elevated temperatures.

(2) The acid-enzyme process in which starch is liquified with acid at elevated temperatures followed by saccharification with glucogenic or maltogenic enzymes or mixtures thereof under pH and temperature conditions favorable to the enzymes.

(3) The double enzyme process in which starch is liquified at high temperature with a thermostable endoamylase and then saccharified with glucogenic or maltogenic enzymes as above.

The latter two methods have largely displaced the acid process since: (1) they are less destructive to the substrate, (2) they are much more specific, and (3) allow for the precise formulation of a wide variety of syrups depending on the enzyme systems employed. Currently most brewer's liquid adjuncts are produced by the acid-enzyme procedure.

Fungal glucoamylase does not produce completely superattenuated beer from wort containing low or moderate D.E. (dextrose equivalent) starch-derived syrups. The low or moderate D.E. starch-derived syrups apparently contain a type of dextrin which is not present in cereal adjuncts and which is not hydrolyzed by fungal glucoamylase.

The carbohydrases produced by Schwanniomyces sp. have been studied by many investigators. There are two extracellular amylases secreted by yeast of Schwanniomyces sp. These are an α-amylase which has the ability to hydrolyze the α1,4 linkages of starch and a glucoamylase type debranching enzyme which has the ability to hydrolyze not only the α-1,4 linkages of starch, but also has the ability to hydrolyze the α-1,6 linkages (Oteng-Gyang, K. Moulin, G., Galzy, P., Zeitschrift fur Allgemeine Mikrobiologie, 1981, 21, 537: Wilson, J. J., and Ingeldew, M. W., Appl. and Envir. Micro., 1982, 44, 301). Since Schwanniomyces is capable of secreting these starch degrading enzymes, various workers have used this organism for the production of single cell protein or ethanol from starchy substrates (Oteng-Gyang K., et al. Eur. J. Applied Microbiol. Biotech. 9, 129, 1980; Callegja G., et al. Biotech. Lett. 4, 543, 1982).

Recently Canadian workers (Sills, A., et al. Proceedings of the European Brewing Convention, 1983) have shown that, like fungal glucoamylase, the carbohydrases produced by this yeast may be used to prepare a superattenuated (i.e. reduced carbohydrate content) beer. The carbohydrases employed by these workers contained an α-amylase in addition to a glucoamylase type debranching enzyme. These workers noted an inverse relation between the time of addition and the degree of superattenuation i.e., delayed addition yielded beers with higher degrees of attenuation.

SUMMARY OF THE INVENTION

It is an object of the present invention to disclose a method of preparing a superattenuated beer from a wort containing liquid adjuncts.

We have discovered that a glucoamylase type debranching enzyme produced by *Schwanniomyces castellii* can be used to prepare completely superattenuated beers from worts containing as a liquid adjunct a low to moderate D.E. (dextrose equivalent) starch-derived syrup. This discovery was unexpected because, as previously mentioned, fungal glucoamylase cannot be used to prepare completely superattenuated beer from worts containing such liquid adjuncts.

DETAILED DESCRIPTION OF THE INVENTION

In the examples which follow, the following analytical methods were used. Glucoamylase type debranching activity was determined by measuring the glucose produced by hydrolysis of a 2% solution of soluble starch at pH 5.0 and 40° C. A unit of activity was defined as the production of 1 micromole glucose/min. under these conditions. Alpha-amylase was monitored by the hydrolysis of 1% Lintner starch at pH 5.0 and 40° C. The reaction was monitored by the rate at which the blue color of the starch iodine complex was discharged. (Van Dyk, J. and Caldwell, M., Anal. Chem. 38, 318, 1956).

The parent yeast used in these studies was *Schwanniomyces castellii* ATCC 26077 which was obtained from the American Type Culture Collection, Rockville, Md. A mutant resistant to 2-deoxyglucose was selected essentially as described by M. R. Dhawale and W. M. Ingledew in Biotech. Lett. 5, 185, 1983 which is incorporated by reference herein. The mutant selected was cultured aerobically in a complex medium containing suitable carbon, nitrogen and mineral sources along with a nutrient supplement. At an appropriate time during the stationary phase the cells were removed by centrifugation and the clear supernate was recovered. This supernate can be used as a crude enzyme preparation.

The *S. castellii* glucoamylase type debranching enzyme was concentrated and partially purified by the addition of cold acetone to cold culture supernate until a precipitate formed which was then recovered and redissolved in water. This procedure recovered all of the glucoamylase type debranching enzyme, which was substantially free of the α-amylase. This preparation will be referred to hereafter as Schwanniomyces enzyme (SE).

Fungal glucoamylase (FGA) was obtained from either Miles Laboratories Inc., Elkhart, Ind. or NOVO Biochemical Ind. Ltd., Frankinton, N.C.

In the examples the FGA and SE were used in equivalent amounts. Normally the amount of SE employed to superattenuate beer will be about 200 to about 1400 u/l. The optimum amount will depend upon the dextrin content of the liquid adjunct.

Amaizo 43/42 corn syrup was obtained from American Maize Products Co., Hammond, IN. This is a 43 D.E., 80% solids syrup prepared by the acid hydrolysis of corn starch. Globe 1632 corn syrup was obtained from CPC International Inc., Englewood Cliffs, N.J. Sta-Bru 3405 was obtained from A.E. Staley Co., Decatur, Ill. Both of the latter products are typical brewer's liquid adjuncts supplied as 60–65 D.E. 80–85% w/w solids syrups. They differ slightly in the proportions of dextrose and maltose. The syrups employed all contained significant concentrations of dextrins.

Profiles of the carbohydrate concentration of the syrups are set forth in Table 1:

TABLE 1

| Syrup | Carbohydrate Composition of Syrups | | | |
|---|---|---|---|---|
| | DP 1%[a] | DP 2% | DP 3% | >DP 3% |
| Amaizo 43/42 | 20.0 | 15.0 | 11.6 | 53.4 |
| Globe 1632 | 35.5 | 30.0 | 13.0 | 21.5 |
| Sta-Bru 3405 | 31.0 | 36.0 | 10.0 | 23.0 |

[a]% on dry basis

All sugars are identified by degree of polymerization (DP number); e.g.
DP-1 = monosaccharide assumed to be predominantly glucose
DP-2 = disaccharide assumed to be predominantly maltose
DP-3 = trisaccharide assumed to be predominantly maltotriose
DP-3 = higher saccharides which are nonfermentable The worts prepared with the cereal adjuncts, corn grits and brewer's rice were mashed at a 60:40 malt to adjunct (M/A) ratio using the double mash upward infusion schedule outlined above. The worts prepared with the three kettle adjuncts were mashed as all malt brews and adjusted to an M/A of 60:40 at the kettle. The worts were adjusted to 12°–15° P., aerated, and pitched with *S. uvarum* to a final concentration of $1 \times 10^7$ cells/ml. The appropriate enzymes were added and the beers were fermented at 15° C.

The specific gravities of the beers were monitored and when no further change in gravity was noted, the apparent degree of attenuation (ADA) was calculated from the equation:

$$ADA\ (\%) = \frac{\text{apparent extract of the wort-apparent extract of the beer}}{\text{apparent extract of the wort}} \times 100$$

Example 1

Superattenuated Low Calorie Beer Prepared Using Brewer's Rice

Wort prepared with the cereal adjunct, brewer's rice, at an M/A of 60:40 were fermented in the presence of: (1) no enzyme to establish the attenuation limit, (2) fungal glucoamylase (FGA) added at a rate of 702 u/l and (3) Schwanniomyces enzyme (SE) added at a rate of 729 u/l. The ADA of the beers at end of fermentation (EOF) were 82.9% for the beer fermented with no enzyme, 106.8% for the beer superattenuated with FGA and 108% for the beer superattenuated with SE. The ADA was increased by 23.9 and 25.1% with FGA and SE respectively.

EXAMPLE 2

Superattenuated Low Calorie Beer Prepared Using Corn Grits

Wort prepared with the cereal adjunct, corn grits, at an M/A of 60:40 was fermented in the presence of FGA and SE as in Example 1. At EOF the ADA of the beers were 106.7% and 107.5% for the beers superattenuated with FGA and SE respectively. As with the rice brew the ADA was increased 23.7% and 24.5% with FGA and SE.

EXAMPLE 3

Superattenuated Low Calorie Beer Prepared Using a High Dextrin Acid Syrup as Kettle Adjunct An all malt wort was adjusted to an M/A of 60:40 by the addition of Amaizo 43/42 syrup at the kettle. The resulting wort was fermented with no enzyme, FGA, and SE as in Example 1. At EOF the ADA for the beers were 67.3% with no enzyme, 104.2% with FGA and 106.7% for SE. Thus the ADA was increased by 36.8% and 39.4% with FGA and SE respectively. The ADA of the beer prepared with SE was identical to the beers of Examples 1 and 2 prepared from worts using brewer's rice and corn grits. In contrast, the beer superattenuated with FGA was about 3% lower in ADA than the comparable beers prepared with cereal adjuncts. At EOF the beer prepared with SE was substantially lower in specific gravity than the beer superattenuated with FGA.

EXAMPLE 4

Superattenuated Low Calorie Beers Prepared Using Brewer's Syrups as Kettle Adjuncts All-malt worts were adjusted to 60:40 M/A using the brewer's adjuncts Globe 1632 or Sta-Bru 3405 as in Example 3. The resulting worts were each fermented in the presence of no enzyme, FGA and SE as in Example 1. At EOF, the ADA of the beers prepared from Sta-Bru 3405 were 83.2% with no enzyme, 104.1% with FGA and 106.7% with SE. The ADA of the beers prepared with Globe 1632 was 83% with no enzyme, 103.8% with FGA and 106.9% with SE. Thus the attenuation limit was increased 21 and 24% with FGA and SE respectively. Again SE superattenuated the beers to the same ADA as when the worts were prepared with cereal adjuncts; whereas, FGA yielded a beer about 3% lower in ADA and substantially higher in EOF specific gravity.

The examples cited above demonstrate that SE is more effective than fungal glucoamylase in superattenuating beers prepared from either commercial brewer's liquid adjuncts or high dextrin acid syrups. This enzyme superattenuates the beers to the same ADA regardless of the source of the adjunct. Thus comparable beers were produced from worts prepared using corn grits, rice, acid syrup or brewer's liquid corn adjuncts with SE. In contrast FGA failed to superattenuate the liquid adjunct beers to the same ADA as those prepared with cereal adjuncts.

As previously stated, it was surprising to discover that the glucoamylase type debranching enzyme obtained from Schwanniomyces is effective in preparing a superattenuated beer from a wort containing liquid adjuncts. One skilled in the art would have anticipated that since the *Schwanniomyces glucoamylase* type debranching enzyme had the same activity as fungal glucoamylase in preparing superattenuated beers from worts containing cereal adjuncts, that there would have been no difference in its effect upon a wort containing liquid adjuncts. However, a completely superattenuated beer can be prepared from a wort containing liquid adjuncts by employing the glucoamylase type debranching enzyme from Schwanniomyces. Thus, the present invention makes it possible to use higher dextrin containing, relatively less expensive starch derived syrups to make a completely superattenuated beer. The low to moderate D.E. starch-derived syrups used as liquid adjuncts will usually have a D.E. of about 30 to about 90 and will normally contain about 70% to about 85% solids on a weight to weight basis. Especially preferred are corn syrups having a D.E. of about 30 to about 65.

It will be apparent to those skilled in the art that the foregoing description has been for purposes of illustration and that a number of changes can be made without departing from the spirit and scope of the present invention. For example, though in the examples a specific mutant of *Schwanniomyces castellii* was employed, the wild type of the yeast and other variants and mutants of the yeast also produce the glucoamylase type debranching enzyme and can be used to superattenuate beer.

We claim:

1. The method of preparing a superattenuated beer from a wort, which wort includes as a starch adjunct a syrup selected from a syrup prepared by the acid process and a syrup prepared by the acid-enzyme process comprising adding to said wort as the sole enzyme preparation a glucoamylase preparation extracted from *Schwanniomyces castellii,* said preparation being substantially free of α-amylase activity.

2. The method of claim 1 in which said syrup is a corn syrup prepared by the acid process.

3. The method of claim 2 in which said syrup is a corn syrup prepared by the acid-enzyme process.

* * * * *